United States Patent [19]

Agrawal et al.

[11] 4,268,727
[45] May 19, 1981

[54] ADAPTIVE DIGITAL ECHO CANCELLATION CIRCUIT

[75] Inventors: Bhagwati P. Agrawal, Stamford; Kishan Shenoi, Fairfield, both of Conn.

[73] Assignee: International Telephone and Telegraph Corporation, New York, N.Y.

[21] Appl. No.: 20,593

[22] Filed: Mar. 14, 1979

[51] Int. Cl.³ .................................................. H04B 3/20
[52] U.S. Cl. ................................................. 179/170.2
[58] Field of Search ................ 179/170.2, 170.6, 170.8

[56] References Cited

U.S. PATENT DOCUMENTS

| 3,647,992 | 3/1972 | Thomas | 179/170.2 |
| 3,732,410 | 5/1973 | MacKechnie | 179/170.2 |
| 3,894,200 | 7/1975 | Campanella et al. | 179/170.2 |
| 3,922,505 | 11/1975 | Hoge | 179/170.2 |
| 4,007,341 | 2/1977 | Sourgens et al. | 179/170.2 |
| 4,057,696 | 11/1977 | Gitlin et al. | 179/170.2 |
| 4,117,277 | 9/1978 | van den Elzen et al. | 179/170.6 |
| 4,131,767 | 12/1978 | Weinstein | 179/170.2 |

OTHER PUBLICATIONS

H. Suyderhoud and M. Onufry; "Performance of a Digital Adaptive Echocanceller in a Simulated Satellite Environment"; Comsat Labs.; Apr. 24, 1972; pp. 1–12.

Primary Examiner—Bernard Konick
Assistant Examiner—Randall P. Myers
Attorney, Agent, or Firm—John T. O'Halloran; Jeffrey P. Morris

[57] ABSTRACT

The present invention discloses an adaptive digital echo cancellation circuit including a finite impulse response digital filter, wherein the digital filter coefficients are adapted by continuous updating to compensate for telephone subscriber line echo conditions to enable the digital filter to continuously simulate the instantaneous subscriber line echo. The continuous coefficient update is provided by a correlator which includes provision for introducing non-linearities into the PCM transmitted and received signals, in parallel with the speech path, to derive a simplified digital representation of the PCM speech, thereby reducing the signal processing hardware required by the correlator to derive the updated filter coefficients.

19 Claims, 9 Drawing Figures

FIR FILTER SCHEMATIC

W NONLINEARITY I/O CHARACTERISTICS

W NONLINEARITY FLOWCHART

X NONLINEARITY

X NONLINEARITY FLOWCHART

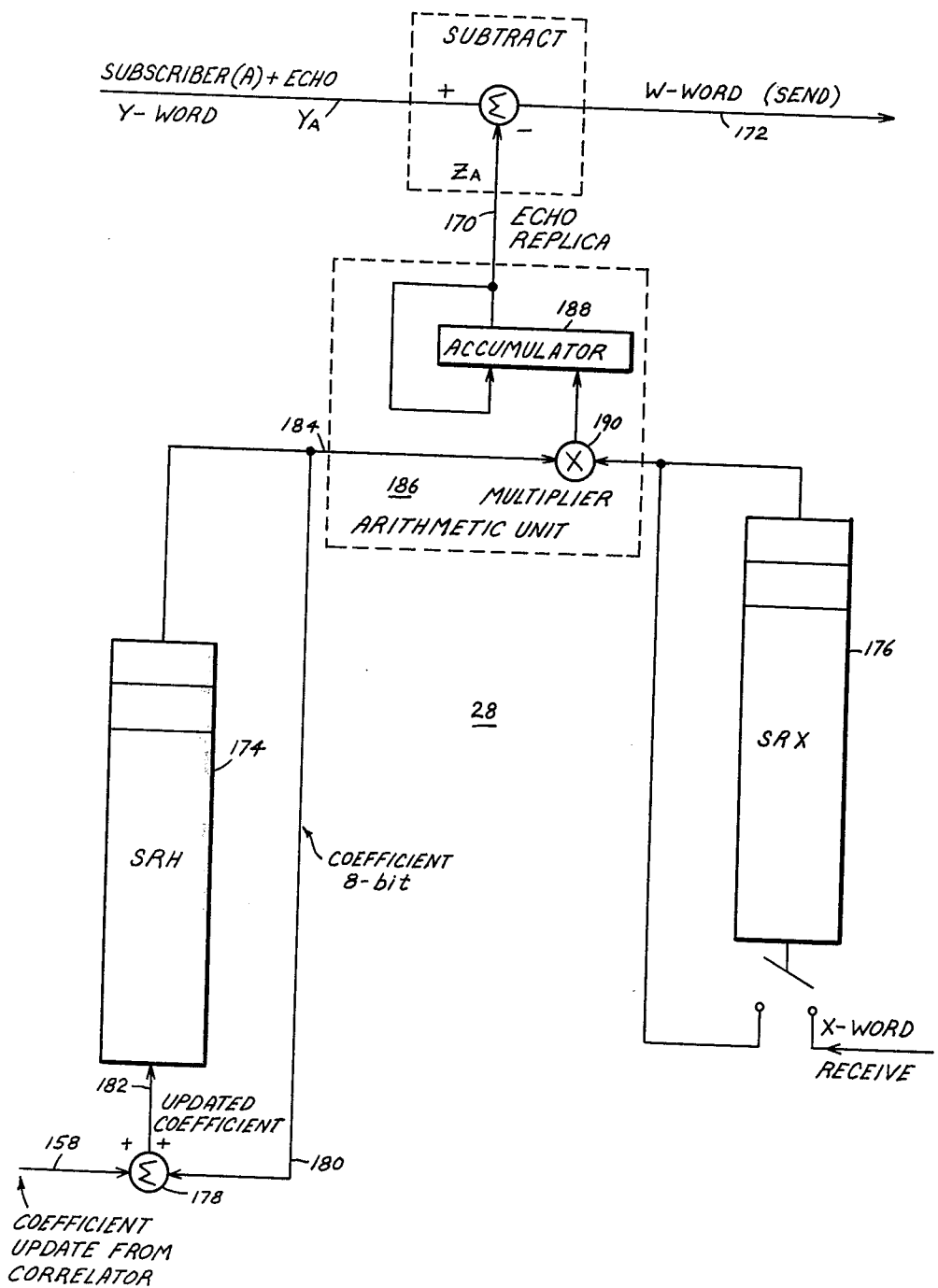

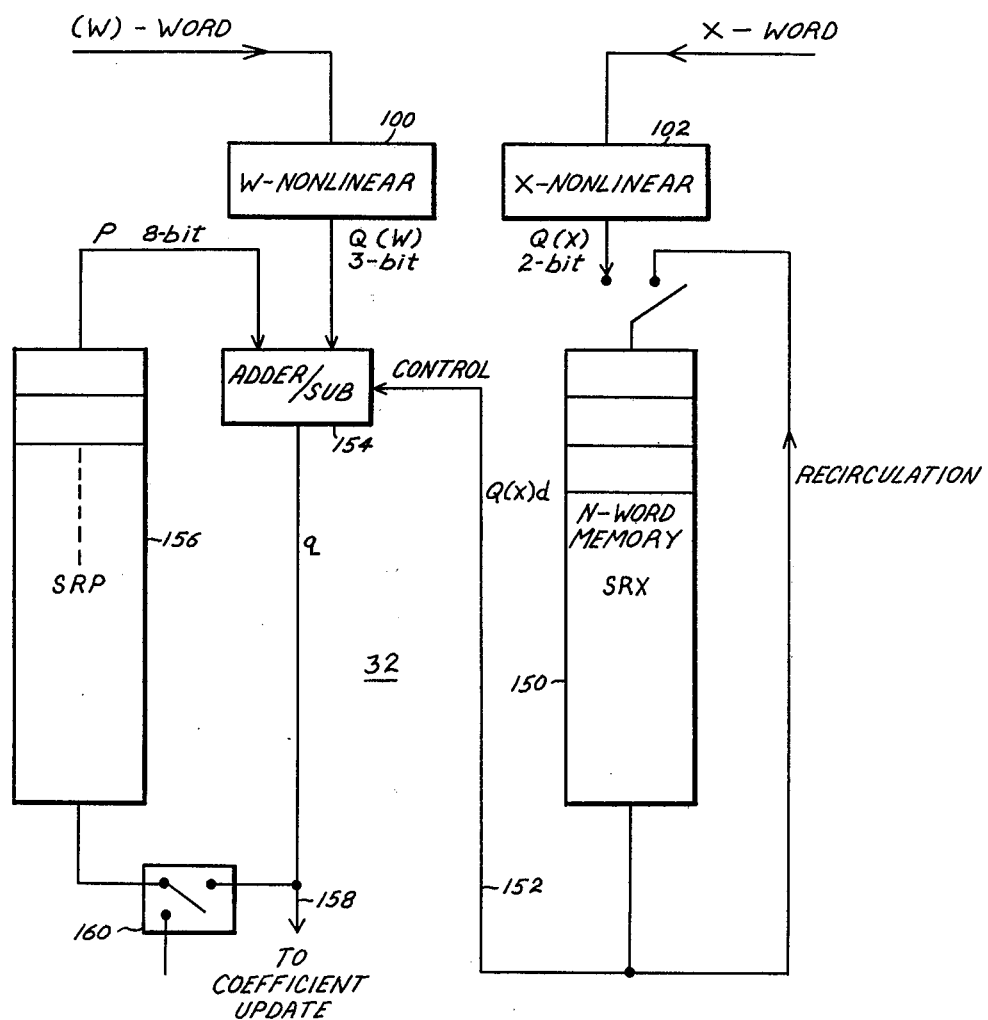

ADAPTIVE DIGITAL ECHO CANCELLATION CIRCUIT

BACKGROUND OF THE INVENTION

1. Field of the Invention

The present invention relates generally to digital telephone line circuits having improved adaptive echo cancellation capability, and which are used in conjunction with a two-to-four wire hybrid circuit, and specifically to a technique for simplifying the hardware requirements for adaptively generating and varying the digital filter coefficients of a finite impulse response digital filter in the line circuit in accordance with echo conditions to cancel undesired signal return.

2. Description of the Prior Art

The generation of undesirable echoes in the two-to-four wire conversion (hybrid) circuit of a telephone subscriber line/trunk circuit is a well known problem in telephony. Such echoes result from an impedance mismatch in the balancing network of the hybrid when the balance impedance value in the balancing network does not match a perfect line termination impedance under conditions which normally vary with time. In a digital telephone system, such analog echoes are digitized and transmitted from the calling to the called party together with the desired digitized speech, which can result in a "rain barrel" effect. Various digital filtering techniques have been developed and are known in the telephony art for cancelling this echo in which a replica of the undesired echo signal is derived, and then subtracted from the sum of the desired signal and the undesired echo signal prior to transmission. Known echo cancellation techniques suffer from one or more of the following problems: they are complex and costly to implement, they introduce distortion into the speech path, and they involve the processing of complex signals with associated large scale digital multiplication circuitry, which is both complex and expensive.

For example, a digital echo cancellation circuit for satellite communication and long distance telephone circuits is described in *Echo Control in Telephone Communication*, by H. G. Suyderhoud, et al., COMSAT Laboratories, 1976. This circuit includes a finite impulse response (FIR) digital filter having variable coefficients to generate a replica of the echo signal for echo cancellation. *A New Structure for Adaptive Digital Echo Cancellation*, of R. D. Gitlin, et. al., Bell Telephone Laboratories, Holmdel, N. J., 1976 describes the use of a pair of FIR digital filters having variable coefficients for eliminating echo by adapting the coefficients to cause the filters to cancel the echo. The additional publications, *Echo Cancellation in a Two-Wire Full-Duplex Data Transmission System with Bipolar Encoding*, of H. C. van den Elzen, et. al. Philips Research Laboratories, Eindhoven, Netherlands, 1976; and *Echo Cancellation Techniques For Full-Duplex Data Transmission on Two-Wire Lines*, of D. D. Falconer, et. al., Bell Telephone Laboratories, Holmdel, N. J., 1976, both disclose the use of FIR digital filters having variable coefficients for adaptively cancelling echoes in data transmission systems.

For structural details of known FIR digital filters, of which there are many, reference is made to U.S. Pat. Nos. 3,639,848 of J. Elliott, *A Transverse Digital Filter;* 3,665,171 of J. Morrow, *A Nonrecursive Digital Filter;* and 3,928,755 of M. Bellanger, et. al., *A Low Pass Nonrecursive Digital Filter.*

All of the foregoing articles include or require means associated with the FIR filters for deriving control signals for varying the filter coefficients which includes or requires substantial complex and costly digital circuitry for digitally multiplying data associated with the signal processing data. In contradistinction, and in accordance with the present invention, a novel correlation technique is described for adaptively deriving the filter coefficients whereby nonlinearities are introduced into the transmitted and received signals to enable the correlation circuit to derive an output representative of the variation of the filter coefficients required to define the requisite echo replica produced by the filter without the heretofor required complex digital multipliers. The correlator output adaptively varies the coefficients of the FIR digital filter in accordance with the instantaneous echo conditions of the line circuit to cancel undesired echo return in a telephone subscriber system.

SUMMARY OF THE INVENTION

The present invention relates generally to adaptive digital echo cancellation, and more specifically to an improved correlation circuit and finite impulse response digital filtering technique wherein the digital filter coefficients are adapted by continuous updating to compensate for telephone subscriber line echo conditions to enable the digital filter to continuously simulate the instantaneous subscriber line echo, with the continuous coefficient update being provided by the correlator. The correlator includes provision for introducing nonlinearities into the PCM transmitted and received signals, in parallel with the speech path, to derive a simplified digital representation of the PCM speech, thereby reducing the signal processing hardware required by the correlator to derive the updated filter coefficients.

BRIEF DESCRIPTION OF THE DRAWINGS

FIG. 8 is a further schematic illustrative of a finite impulse response digital filter in accordance with the present invention;

FIG. 9 is a block diagram of a correlator circuit in accordance with the present invention.

DESCRIPTION OF THE PREFERRED EMBODIMENT

Figure 1:
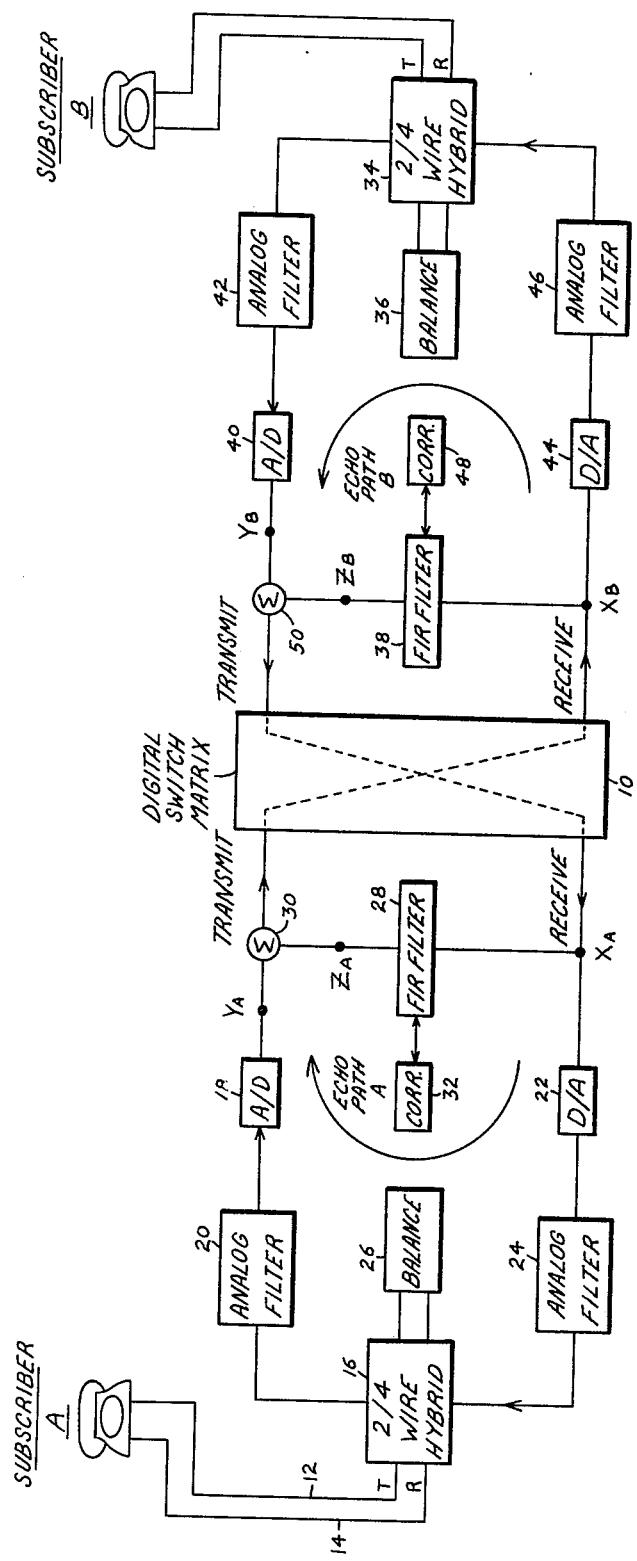
FIG. 1 is a simplified block diagram of a pair of telephone subscriber line circuits in accordance with the present invention, interconnected thru a digital switching matrix.

Referring now to FIG. 1, two subscriber loops of a telephone transmission system intercoupled thru a digital switching matrix 10 is illustrated. Telephone subset A is coupled via a two-wire analog line including tip and ring lines 12 and 14 to a two-to-four wire hybrid circuit 16 which connects the two-wire analog line to a four-wire line, two lines in the transmit direction and two lines in the receive direction, shown representatively as single lines. Such hybrid circuits are well known and serve to insert gain into the transmit and receive paths, for which one-way amplifiers are used, which require two lines in each direction. Such hybrid circuits also include a balancing network for matching the line impedance, typically 900-ohm and 2-microfarad. A description of hybrid operation may be found in *Reference Data for Radio Engineers*, Sixth Ed., 1975, Howard W. Sams, pg. 35-16 thru 35-20. A digital hybrid circuit is described by copending U.S. Patent Application Ser. No. 903,458, now U.S. Pat. No. 4,161,633 filed May 8, 1978 and assigned to the same assignee as is the present application, and reference may be made thereto for details of the operation of a digital hybrid circuit. Typically, the two-to-four wire hybrid circuit, while serving to connect the two-wire and four-wire paths for normal speech transmission, also sets up a leakage return path for speech, due to imperfect matching of the characteristic impedance of the line by the balance impedance, and such leakage appears as echo.

The analog hybrid 16 is essentially a four port directional coupler, with the send port coupled to analog-to-digital converter 18 after filtering by an analog filter 20; with the receive port receiving analog signals from digital-to-analog converter 22 after filtering by analog filter 24; with the subscriber loop two-wire analog loop port being coupled to subscriber A tip and ring lines 12 and 14; and with the balance port connected to a balance network 26. The impedance imbalance or mismatch causes echo energy to flow from the receive port to the send port. Absent any mismatch, hybrid 16 would couple the receive signal from its receive port to the two-wire line with a 3-decibel attenuation, and will not couple any of the receive signal to the send port. Such ideal balancing is referred to as infinite echo return loss (ERL). In typical telephone operation, the ERL averages about 15 db; but can be as low as 6 db. It is known to enhance the ERL by inserting moderate attenuation in both the transmission and receive directions. This technique has the detrimental effect of attenuating the speech signal. It is also known to use voice activated switches (echo suppressors) to eliminate echo and enhance the ERL. This technique has the detrimental effect of "chopping" during conversation. The third approach to ERL enhancement, and the approach of the present invention, is the use of an adaptive digital hybrid, wherein the undesired echo is continuously approximate, or "modeled" as the output shown at $Z_A$ of an adaptive digital filter, such as filter 28, having as its input the received signal $X_A$, which includes any echo. The received signal echo as reflected from the hybrid 16 balance network 26 or its equivalent, is superimposed upon the subscriber A transmit signal at $Y_A$. The filter 28 functions to equalize in magnitude the echo portion of $Y_A$ with $Z_A$ and, by combining the two subtractively, in a summation circuit 30, which may comprise a digital adder, the echo is cancelled from the signal transmitted from adder 30. The delay between received signal $X_A$ and transmit signal $Y_A$ is measured by utilizing an algorithm implemented by the digital filter 28, which simulates the echo path A such that the filter impulse response substantially matches the impulse response of the echo path. This technique, as will be described, results in an ERL enhancement in excess of 20 db.

Digital filter 28 is preferably a finite impulse response (FIR) filter, also called a transversal filter. This filter operates similarly to a tapped delay line. The filter coefficients are continuously modified so that the filter output is a replica of the echo from the hybrid. When an input impulse is applied to a FIR filter, the filter output is of finite time duration, i.e. the signal output is convergent. The filter can be recursive, whereby the present filter output is dependent upon the past filter output and upon the present and past inputs. The filter can also be nonrecursive, whereby the present filter output is dependent upon the present and past inputs. In accordance with the present invention, the filter 28 coefficients are "adapted", or calculated by cross-correlating an error signal derived by a correlator 32 with the received signal $X_A$ in accordance with an adaption algorithm, called a least mean squares (LMS) algorithm.

The echo cancelled at summation circuit 30 is the echo returning to subscriber B from the impedance mismatch at the hybrid 16 of subscriber A, which echo would, absent cancellation, be digitized at A/D converter 18 and be transmitted thru switching matrix 10 to the line circuit of subscriber B. The subscriber B line circuit is identical as that described with reference to subscriber A. The echo in echo path B is the echo returning to subscriber A from the impedance mismatch at the hybrid 34 balance network 36 (or equivalent) of subscriber B which, absent cancellation by digital FIR filter 38, would be digitized at A/D converter 40, after analog filtering at filter 42, and coupled to the switching matrix 10 for transmission to the subscriber A line circuit. In the subscriber B receive path, received signal $X_B$ (which corresponds the transmitted signal from subscriber A) is coupled to subscriber B after digital to analog conversion at D/A converter 44 and filtering by analog filter 46. The echo replica $Z_B$ derived by filter 38, having coefficients with weights (for a coefficient weighting matrix) derived by correlator 48, is summed at adder 50 with $Y_B$ to obtain the subscriber B transmit signal (which is the $X_A$ signal of subscriber A) in like manner as the subscriber A transmit signal is derived.

The adaption algorithm implemented by a digital filter implemented in accordance with the present invention will now be described.

The pulse code modulated (PCM) signals derived from the incoming analog speech signals are obtained at A/D converter 18 and associated circuitry, by uniformly sampling and digitizing the analog speech signals, as is well known in the telephone art. Reference may be made to the aforementioned *Reference Data for Radio Engineers*, Sixth Ed. at 23-19 thru 23-22 for a description of PCM encoding.

The PCM sampling interval T is constant, hence the value s(nT) acquired by the near end (subscriber A) signal s(t) at the n-th instant may be represented by $S_n$. Similarly, $X_n$, $W_n$, and $Z_n$ denote the values of receive, transmit and echo signals at the n-th instant, respectively. Also, $y_n$ is defined as the sum of the near end signal $S_n$ and the echo signal $Z_n$:

$$Y_n = S_n + Z_n$$

and $W_n$ is defined as the sum of $y_n$ and the negative value $\hat{Z}_n$ of the output of the digital filter (the derived replica of the echo):

$$W_n = Y_n - \hat{Z}_n$$

The echo path includes the analog hybrid 16, analog filters 20 and 24, A/D converter 18, D/A converter 22 and other associated circuitry, is substantially linear and time invarient. Thus, an input signal on the echo path is equal to the product of a constant and the output signal from the echo path, and superposition of signals applies.

Optimally, the FIR filter 28 must have an impulse response $C_k$, $K=0,1,\ldots(M-1)$ so as to minimize, on the average, the echo power Pec defined by:

Pec$=E\{(W_n - S_n)^2\}$, where E is a mathematical averaging operator.

The equation for the optimum (ideal) coefficients of filter 28, called the Wiener coefficients, can be written in matrix notation as $h = R_{xx}^{-1} R_{xy}$, where $R_{xx}$ is the correlation of receive signal $X_n$; $R_{xy}$ is the cross-correlation of the $X_n$ and $Y_n$. Thus, h represents the ideal correlation between the filter input and output signals.

Written in vector notation, the correlation matrix $R_{xx}$ and the cross-correlation vector $R_{xy}$ are:

$$(R_{xx})_{ij} = r_{xx}(i-j)$$

$$(R_{xy})_i = r_{xy}(i)$$

where i and j represent the i-th row and j-th column of the matrix. For on-line signal processing, $R_{xx}$ and $R_{xy}$ are unknown a-priori, but must be estimated mathematically by summations of the form:

$$r_{xx}(i-j) = <X_{n-i+j}\, X_n> = \frac{1}{N}\sum_{k=n-N+1}^{n} X_{k-i+j}$$

and $$r_{xy}(i) = <X_{n-i}\, Y_n> = \frac{1}{N}\sum_{k=n-N+1}^{n} X_{k-i}Y_k$$

where N is the number of terms in the correlation (the correlation length) and n is a time index, i.e., when $t=0$, $n=0$.

Mathematical inversion of correlation matrix $R_{xx}$ is not feasible due to the amount of computation required.

The received and near-end signals are variable; however, the echo path may be considered as time-invariant within a particular call, but not time-invariant from call-to-call. The foregoing solutions to the FIR filter design require computations which are too complex for real-time applications. This can be overcome by an adaptive filter with a computationally efficient adaption algorithm for adjusting the weights of the filter coefficients to minimize the mean squared error $(W_n - S_n)^2$ without requiring estimation of the unknown correlation matrix $R_{xx}$ and the computation of the inverse correlation matrix $R_{xx}^{-1}$.

It has been discovered that the following weighting matrix provides a close approximation of h and will implement a least-mean-square adaption algorithm. This provides the weighting matrix which multiplies the digital filter input to derive the negative echo replica. The instantaneous estimated coefficient value c is derived for the FIR filter of FIG. 7 as follows:

The coefficient vector at the (n+1)-st step $c^{(n+1)}$ is equal to the coefficient vector at the n-th step $c^{(n)}$ plus a change ($\Delta$) proportional to the negative gradient of the output signal power:

$$c^{(n+1)} = c^{(n)} - u\Delta^{(n)}$$

The step size, (u) is a parameter which controls the rate of convergence of the algorithm. The gradient of the mean output power at the n-th step is represented by $\Delta^{(n)}$.

Figure 7:
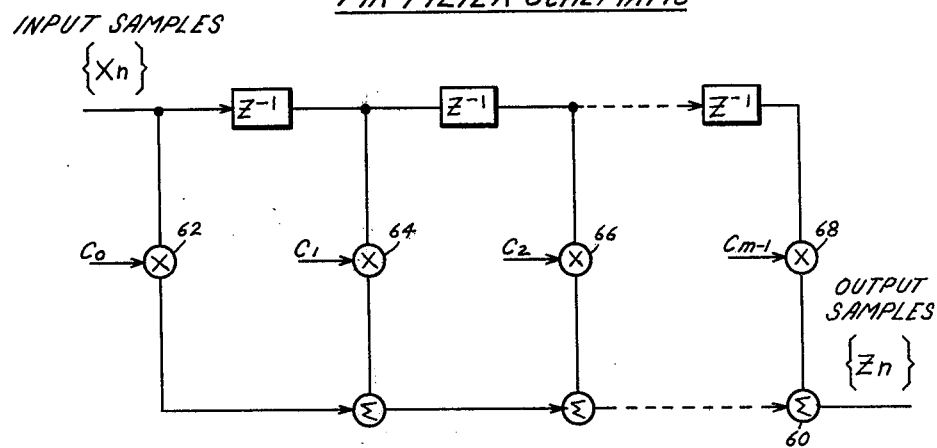
FIG. 7 is a simplified schematic illustrative of the operation of a finite impulse response digital filter in accordance with the present invention.

FIG. 7 illustrates a FIR digital filter such as filter 28 wherein a plurality of input samples $X_n$, which may comprise 14-bit PCM words at 8 KH, are multiplied by a coefficient matrix derived from a plurality of succeeding filter stages such that:

$$Z_n = C_0 X_n + C_1 X_{n-1} + \ldots C_{M-1} X_{M-1}$$

and wherein $Z^{-1}$ represents a unit sample delay, which may be implemented by a parallel shift register. The totality of the input samples multiplied by the coefficient matrix is summed to yield the output sample $Z_n$ using a digital adder. The individual arithmetic operation stage-by stage whereby the input samples are multiplied by their respective coefficients is in multipliers 62, 64, 66, ... 68. The various multipliers could be implemented by time-sharing a single multiplier or a few digital multipliers.

A large correlation length is desirable, since the limiting echo return loss enhancement is proportional to the correlation length, N. In prior art adaptive digital filters, a single sample of $W_n$ has been used in order to estimate the gradient $\Delta^{(n)}$. The following algorithm is implemented by the digital filter 28:

(a) Filter output and cancellation:

$$Z_n = \sum_{k=0}^{N-1} h_k x_{n-k}$$

$$W_n = Y_n - Z_n$$

(b) Coefficient correction:

$$\Delta h_k = \frac{1}{N} \sum_{i=n-N+1}^{n} Q(w_i)\, Q(x_{i-k})$$

$$h_k(\text{new}) = h_k(\text{old}) + \Delta h_k$$

with update performed every NT seconds.

In the absence of near-end signal, the above algorithm will converge, i.e. enhance the ERL by 30 db in about 100 milliseconds. In the presence of near-end signal (double-talk), the convergence time increases and the ERL decreases as a function of the near-end signal power.

The filter coefficients are determined by the correlator 32, described with reference to FIG. 9. Correlators of the prior art are complex circuits which must be capable of multiplying thousands of different possible PCM output codes. In accordance with the correlator operation of the present invention, nonlinearities are introduced into the paths of the transmitted and received signals coupled to the correlator to enable the correlator to perform simple calculations which indicate whether or not echo is present. This eliminates the complex digital multiplications heretofore required by the correlator, which functions as the adaption logic, and enables the FIR filter to adjust to varying line echo conditions.

Figure 2:
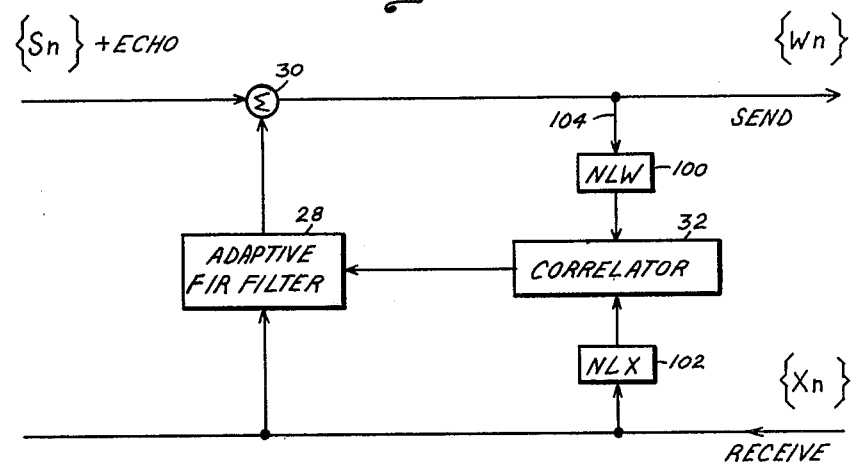
FIG. 2 is a simplified block diagram illustrative of the correlator operation of the present invention.

FIG. 2 shows, in simplified form, the introduction of nonlinearity circuits between the correlator and the send (transmit) and receive lines. Nonlinearity circuits 100 and 102 serve to reduce the PCM word length coupled to correlator 32, which greatly simplifies the correlator arithmetic operations.

Figure 3:
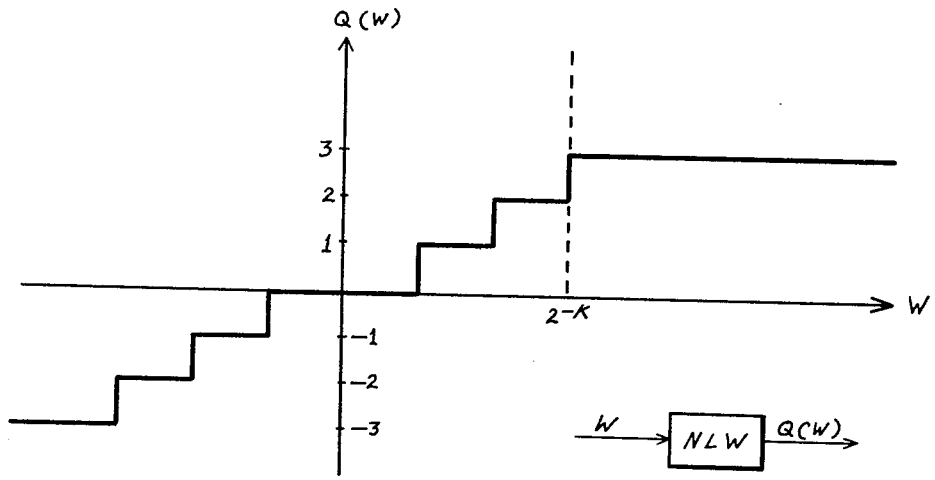
FIG. 3 is a graph illustrative of the input/output characteristic of one of the nonlinearity circuits described with reference to FIG. 2.
Figure 4:
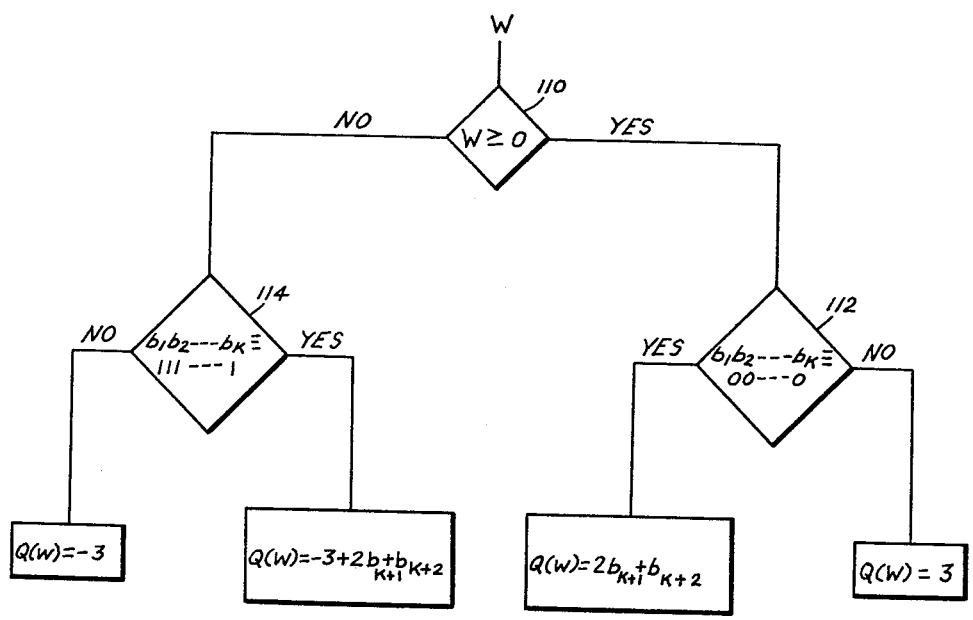
FIG. 4 is a flowchart of the operation of the nonlinearity circuit described with reference to FIG. 3.

Referring to FIGS. 3 and 4, the nonlinearity circuit 100 in the send path (which operates upon PCM words transmitted from subscriber A) is described. The nonlinearity is introduced in that the nonlinear signal can be operated upon by the correlator 32 without digital multiplication and with greatly simplified circuitry. Conventional linear-PCM signals, such as send words (w), are encoded into approximately 8000 possible different outputs. The nonlinearity circuit 100 receives the PCM send words (w) and re-encodes them into an output signal Q(w) having only seven possible outputs, but containing all the information necessary for echo cancellation. FIG. 3 illustrates the Input/Output characteristics of nonlinearity circuit 100. PCM input words (w), which are (n+1) bit words in 2's complement representation are coupled to circuit 100 via line 104. Typically, words (w) are 13-bit PCM words of the form:

$$w = (b_0, b_1, b_2, \ldots b_n), \text{ where}$$

$$w = -b_o + \sum_{i=1}^{n} b_i 2^{-i}, \text{ where } |w| \leq 1$$

The seven possible output values Q(w) are 3, 2, 1, 0, −1, −2, and −3; and are derived in accordance with the flowchart of FIG. 4, which illustrates a logic implementation of nonlinearity circuit 100 capable of implementation by a variety of simple logic gates, designed to implement the described logical functions.

The first operation performed upon 13-bit PCM word (w) by nonlinearity circuit 100 is the decision by decision logic 110 whether $w \geq 0$, by examining the sign bit $b_o$ of word (w). If the answer is YES, then word (w) is coupled to decision logic 112, which examines any desired number of bits, i.e. k-bits of word (w) to determine if the k-bits are all logical "zero's". If the answer is YES, then the output value Q(w) will equal $2b_{k+1} + b_{k+2}$ which is a value between 0 and 3 depending upon the values of $b_{kh}$ and $b_{k+2}$. If decision logic 112 determines that the k-bits are not all "zero's", then the output value of Q(w) will be equal to the value 3. If the answer from decision logic 110 is NO (that w is not $\geq 0$), then word (w) is coupled to decision logic 114, which examines word (w) to determine if the logical bits thereof are all "ones". If the answer is YES, then the value of Q(w) is determined to equal $-3 + 2b_{k+1} + b_{k+2}$ which is a value between 0 and −3. If the answer from decision logic 114 is NO, then the value of Q(w) is determined to be −3.

Figure 5:
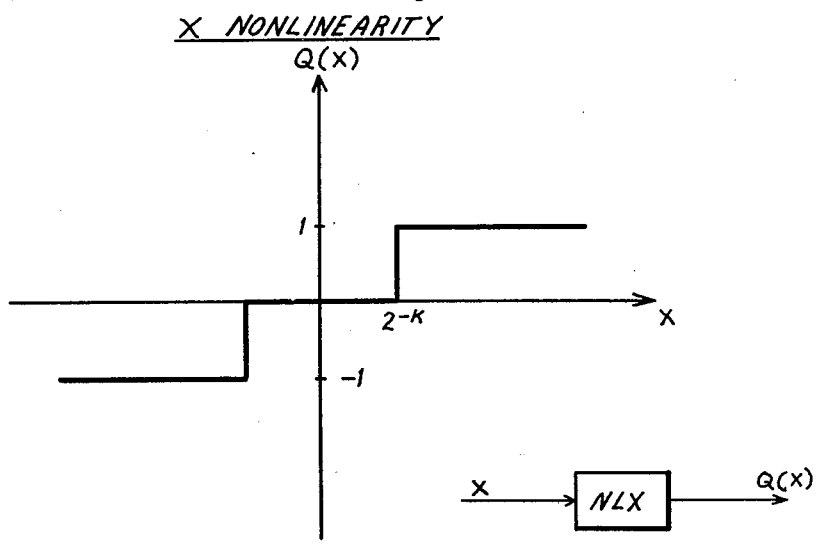
FIG. 5 is a graph illustrative of the input/output characteristic of the other of the nonlinearity circuits of the present invention described with reference to FIG. 2.
Figure 6:
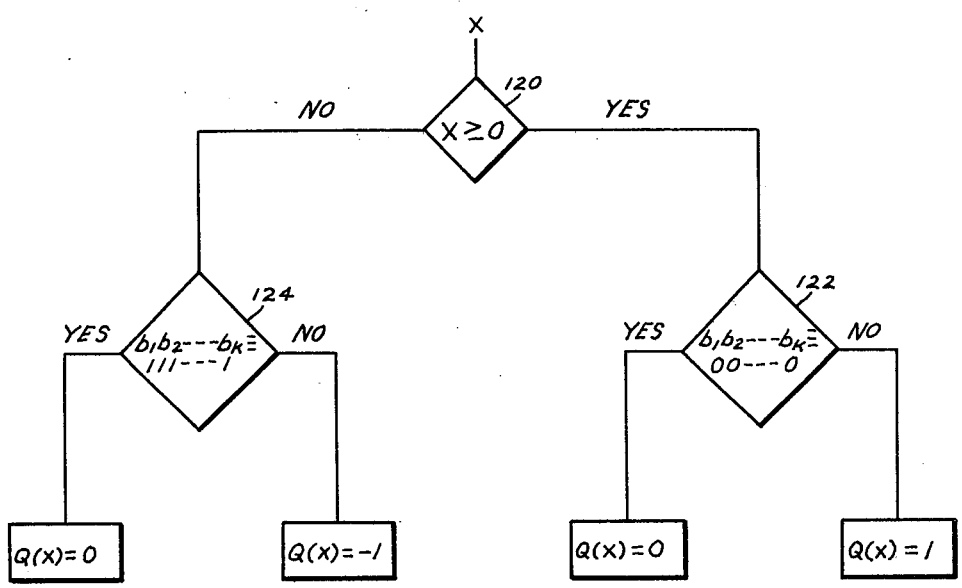
FIG. 6 is a flowchart illustrative of the operation of the nonlinearity circuit described with reference to FIG. 5.

Referring now to FIGS. 5 and 6, a graph and flowchart are shown respectively, illustrative of the operation of the receive, x-nonlinearity circuit 102 to which are coupled PCM words from subscriber B. As is apparent with reference to FIG. 5, nonlinearity circuit 102 has only three possible outputs at (Q(x), i.e. (1, 0 and −1) which are derived from the various possible input PCM words (x) coupled to the input thereof. The receive word (x) is also an (n+1)-bit word, of the same bit length as is the send word (w), and which in 2-s complement notation is:

$$x = (b_0, b_1, \ldots b_n), \text{ where}$$

$$x = -b_o + \sum_{i=1}^{n} b_i 2^{-i}, \text{ where } |x| \leq 1$$

The derivation of the three possible outputs from nonlinearity circuit 102 is shown by the flowchart of FIG. 6. The described logical operation may be implemented by a variety of known digital logic circuitry. The received x-words are coupled to decision logic 120 which makes a logical determination whether $x \geq 0$ by examining the sign bit $b_0$ of the x-word. If the answer of decision logic 120 is YES, then the x-word is coupled to decision logic 122 which examines k-bits ($b_1 \ldots b_k$) of the x-word to determine if the k-bits are all "zero's". If the answer from decision logic circuit 122 is YES, then the value "zero"(0) is obtained for Q(x). If the answer of decision logic circuit 122 is NO, then the value "one" (1) is obtained for Q(x). If decision logic circuit 120 outputs a NO answer to the input decision request as to whether $x \geq 0$, then the x-word is coupled to decision logic circuit 124, which examines k-bits ($b_1 \ldots b_k$) of the x-word to determine if the k-bits are all "one's". If the answer from decision logic 124 is YES, then the value "zero" (0) is obtained for Q(x). If the answer from decision logic 124 is NO, then the value "minus one" (−1) is obtained for Q(x).

Referring now to FIG. 9, the correlator 32 operation is described. Essentially, correlator 32 digitally correlates the simplified send and receive replica signals Q(w) and Q(x), not the more complex PCM signals which are inputted to the nonlinearity circuits 100 and 102. Correlator 32 performs the function of accumulating the product of the present send signal Q(w) and the delayed receive signal Q(x) for time delays up to N. Since the values of Q(x) are +1, 0 and −1, no multiplication of coefficients is required, but rather, the 2-bit words representative of Q(x) are coupled to an N-word memory comprised of a recirculating shift register 150. Register 150 holds past samples of the x-word in the form of Q(x) values. The output of register 150 is coupled via line 152 to the control input of a digital adder/subtraction circuit 154, of conventional design. The Q(x) data controls circuit 154, which functions as an arithmetic unit and which performs the function:

$$q = p + Q(w) \text{ if } Q(x)_d = 1$$

$$q = p - Q(w) \text{ if } Q(x)_d = -1$$

$$q = p \text{ if } Q(x)_d = 0, \text{ where}$$

$Q(x)_d$ is Q(x) delayed, p is 8-bit words representative of correlation values, and q is an 8-bit word representative of update data for updating the filter coefficients. The shift register 150 which stores the past values of Q(x) is updated when a new x-word arrives at nonlinearity circuit 102, is converted to Q(x), and circulates thru register 150 between new x-word arrivals, completing N shifts in the interval between incoming x-words. Similarly, shift register 156, which stores the correlation values p for delays of zero (0) thru (N−1), couples the correlation values p to adder/subtraction circuit 154 wherein the real time 3-bit word Q(w) effectively multiplied by the delayed 2-bit word $Q(x)_d$ is accumulated, resulting in correlation between $Q(w)$ and $Q(x)_d$. Upon completion of this correlation and the updating of the filter coefficients via line 158, register 156 is reset to zero by switch 160. The interval T between x-words is the same as the interval between w-words. Thus, the sampling rate is (1/T). Adder/subtractor 154 may comprise a model 74181 logic circuit, which is commonly available, and which performs N operations in interval T.

Referring now to FIG. 8, a simplified representation of the hardware configuration of an adaptive FIR filter, such as filter 28, is shown, having a coefficient matrix updated via line 158 from the correlator 32. From FIG. 1, it has been described that $Y_A$ words are coupled to the positive input of a summation circuit 30 to implement the subtraction of $Z_A$ words coupled thereto on line 170 (echo replicas derived from FIR filter 28) from the $Y_A$ words (subscriber A transmission+echo) to derive send words (w-words) on line 172 substantially echo-free. Summation circuit 30 may comprise, for example, a model 74181, which is readily available. The FIR filter 28 is comprised of two length-N, (N-words of storage) recirculating shift registers 174 and 176. Shift register 174 holds N of the filter coefficients and shift register 176 holds N of the receive (x-word) samples from subscriber B. New (updated) coefficient values from correlator 32 are coupled via line 158 to one input of a summation circuit 178 having two positive inputs, with the recirculating filter coefficients being coupled to the other input thereof on line 180. The updated coefficients are coupled to register 174 via line 182 from summation circuit 178, which may, for example, comprise a model 74181, which is readily available. Shift registers 174 and 176 could, if desired, be split into smaller and more convenient size blocks, and the illustrated configuration is exemplary only. Registers 174 and 176 are also readily available, such as model no. 2518 manufactured by Signetics. The updated coefficient values on line 184 are coupled on line 184 to the arithmetic unit 186 of the filter. Arithmetic unit 186 is comprised of an accumulator 188 and a multiplier 190. The values of the updated coefficients represent a compensation for the echo conditions.

Accumulator 188 is similar to a digital adder but includes an additional register to save the accumulated sum. Accumulator 188 may, for example, comprise model 74281 manufactured by National Semiconductor. Multiplier 190 may, for example, comprise an 8-bit by 8-bit digital multiplier such as model TDC 1008J manufactured by TRW, which includes an accumulator. Multiplier 190 and accumulator 188 perform N operations in the same interval T. Timing is conventional; and is not shown, however, timing may be provided either by an internal or external clock. Accumulator 188 is reset to zero every T seconds. Shift register 176 recirculates the past x-samples and accepts a new x-sample every T seconds. The contents of the accumulator 188 (the echo replica) are subtracted from the y-sample forming the w-word (the send signal from subscriber A) every T seconds prior to reset of the accumulator. Adder/subtraction circuit 154 of the correlator may, for example, comprise a model 74181, which is readily available.

While the present invention has been described in connection with a preferred embodiment thereof, it is to be understood that additional embodiments, modifications and applications which will become obvious to those skilled in the art are included within the spirit and scope of the invention as set forth by the claims appended hereto.

What is claimed is:

1. An adaptive digital echo cancellation circuit for a telephone line circuit comprising:

finite impulse response digital filter means having a plurality of delay stages and having coupled thereto a plurality of received digital words, for obtaining for each sample interval of N words the product of N of said digital words and a plurality of updated coefficients each associated with one of said digital filter stages to derive an output representative of the value of an undesired signal portion of a plurality of transmitted digital words;

summation circuit means having coupled thereto a plurality of transmitted digital words having superimposed thereon an undesired signal portion, and the output of said digital filter representative of the value of said undesired signal portion, and having an output comprised substantially of said transmitted digital words;

correlator means coupled to said digital filter means for obtaining an N term average correlation for each sample interval of N words of digital signals representative of N of said transmitted digital words and N of said received digital words to derive a control output representative of the instantaneous undesired signal present in said received transmitted digital words to vary said coefficients each N word sample interval in accordance with said control output; and nonlinear circuit means for deriving said digital signals respectively representative of said transmitted and received digital words, such that said representative digital signals are of a bit length less than the bit length of said respective transmitted and received digital words.

2. An adaptive digital echo cancellation circuit in accordance with claim 1, wherein said correlation means includes means for obtaining a cross-correlation of said digital signals.

3. An adaptive digital echo cancellation circuit in accordance with claim 1, wherein said digital words comprise PCM transmission signals.

4. An adaptive digital echo cancellation circuit in accordance with claim 3, wherein said PCM signals are in the form of multi-bit linear PCM words.

5. An adaptive digital echo cancellation circuit in accordance with claim 4, wherein said nonlinear circuit means includes:

means for converting said PCM transmitted words into a first set of digital signals having a number of possible values substantially less than the number of possible PCM values;

means for converting said PCM received words into a second set of digital signals having a number of possible values substantially less than the number of possible PCM values; and means for coupling said first and second sets of digital signals to said correlator.

6. An adaptive digital echo cancellation circuit in accordance with claim 5, wherein at least one of said means for converting said PCM words into first and second sets of digital signals provides for restricting the possible values of said digital signals to values of 0, −1 and 1.

7. An adaptive digital echo cancellation circuit in accordance with claim 5, wherein said correlator means includes:
  recirculating memory means for receiving said second set of digital signals, and having an output;
  shift register means for storing correlation values, and having an output; and
  means having said first set of digital signals and said outputs of said recirculating memory means and said shift register means coupled thereto for accumulating the product of said first set of digital signals and the correlation values controlled by the delayed second set of digital signals.

8. An adaptive digital echo cancellation circuit in accordance with claim 7, wherein said digital filter means includes:
  coefficient storage means;
  summation means having said accumulated product from said correlator and said coefficients coupled thereto for deriving updated coefficients modified by said correlator product; and
  arithmetic means for obtaining the product of said received digital words and said updated coefficients.

9. An adaptive digital echo cancellation circuit in accordance with claim 1, wherein said digital filter means comprises a finite impulse response recursive digital filter.

10. An adaptive digital echo cancellation circuit in accordance with claim 1, wherein said digital filter means comprises a finite impulse response non-recursive digital filter.

11. An adaptive digital echo cancellation circuit in accordance with claim 1, wherein said digital filter is in parallel with the transmission path of said transmitted and received digital words.

12. A telephone subscriber line circuit comprising:
  two-to-four wire converter means coupled to a near-end analog subscriber line;
  analog-to-digital converter means for converting near-end analog signals coupled thereto from said two-to-four wire converter to near-end digital transmission signals comprised of a plurality of digital words
  digital-to-analog converter means for converting far-end digital signals comprised of a plurality of digital words from a far-end subscriber to analog return signals, and having an output coupled to said two-to-four wire converter;
  finite impulse response digital filter means having a plurality of delay stages and having coupled thereto said plurality of far-end digital words, for obtaining for each sample interval of N words the product of N of said far-end digital words and a plurality of updated coefficients each associated with one of said digital filter stages to derive an output representative of the value of an undesired signal portion of said near-end digital words;
  summation circuit means coupled thereto said near-end digital words, having superimposed thereon an undesired signal portion, and also having coupled thereto the output of said digital filter representative of the value of said undesired signal portion, and said summation circuit having an output comprised substantially of said near-end digital words;
  correlator means coupled to said filter for obtaining an N term average correlation for each sample interval of N words of digital signals representative of N of said near-end digital words and N of said far-end digital words to derive a control output representative of the instantaneous undesired signal present in said near-end digital words to update said coefficients every each N word sample interval in accordance with said control output;
  nonlinear circuit means for deriving said digital signals respectively representative of said near-end digital words and said far-end digital words, such that said representative digital signals are of a bit-length less than the bit-length of the respective near-end and far-end digital words.

13. A telephone subscriber line circuit in accordance with claim 12, wherein said correlator means comprises a cross-correlation circuit.

14. A telephone subscriber line circuit in accordance with claim 12, wherein said near-end digital transmission signals and said far-end digital signals comprise PCM transmission signals.

15. A telephone subscriber line circuit in accordance with claim 14, wherein said PCM signals are in the form of multi-bit linear PCM words.

16. A telephone subscriber line circuit in accordance with claim 15, wherein said nonlinear circuit means includes:
  means for converting said PCM transmitted words into a first set of digital signals having a number of possible values substantially less than the number of possible PCM values;
  means for converting said PCM received words into a second set of digital signals having a number of possible values substantially less than the number of possible PCM values; and
  means for coupling said first and second sets of digital signals to said correlator.

17. A telephone subscriber line circuit in accordance with claim 16, wherein said correlator means includes:
  recirculating memory means for receiving said second set of digital signals, and having an output;
  shift register means for storing correlation values, and having an output; and
  means having said first set of digital signals and said outputs of said recirculating memory means and said shift register means coupled thereto for accumulating the product of said first set of digital signals and the correlation values controlled by the delayed second set of digital signals.

18. A telephone subscriber line circuit in accordance with claim 17, wherein said digital filter means includes:
  coefficient storage means;
  summation means having said accumulated product from said correlator and said coefficients coupled thereto for deriving updated coefficients modified by said correlator product; and
  arithmetic means for obtaining the product of said far-end digital signals and said updated coefficients.

19. A telephone subscriber line circuit in accordance with claim 12, wherein said digital filter is in parallel with the transmission path of the transmitted and received digital signals.

* * * * *